(12) United States Patent
Billau et al.

(10) Patent No.: US 11,096,022 B2
(45) Date of Patent: *Aug. 17, 2021

(54) TAILGATING DETECTION

(71) Applicant: INTERNATIONAL BUSINESS MACHINES CORPORATION, Armonk, NY (US)

(72) Inventors: Michael R. Billau, Durham, NC (US); John K. Gerken, III, Apex, NC (US); Jeremy A. Greenberger, San Jose, CA (US); Ciaran E. Hannigan, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 63 days.

This patent is subject to a terminal disclaimer.

(21) Appl. No.: 16/409,099

(22) Filed: May 10, 2019

(65) Prior Publication Data
US 2019/0268736 A1 Aug. 29, 2019

Related U.S. Application Data

(63) Continuation of application No. 15/826,825, filed on Nov. 30, 2017, now Pat. No. 10,334,411, which is a (Continued)

(51) Int. Cl.
*H04W 4/33* (2018.01)
*G07C 9/00* (2020.01)
(Continued)

(52) U.S. Cl.
CPC .......... *H04W 4/33* (2018.02); *G07C 9/00309* (2013.01); *G07C 9/20* (2020.01); *H04W 4/029* (2018.02);
(Continued)

(58) Field of Classification Search
CPC ........................ G08B 13/2491; G07C 9/00007
See application file for complete search history.

(56) References Cited

U.S. PATENT DOCUMENTS

| 4,799,243 A | 1/1989 | Zepke |
| 9,286,741 B2 * | 3/2016 | Adolfsson ............. H04W 12/08 |

(Continued)

FOREIGN PATENT DOCUMENTS

| EP | 755034 | 10/2001 |
| GB | 2416964 | 2/2006 |
| WO | 2015187726 | 12/2015 |

OTHER PUBLICATIONS

Morton,"10 Strategies to Preventing Tailgating", Buildings Smarter Facility Management, http://www.buildings.com/article-details/articleid/13274/title/10-strategies-to-prevent-tailgating.aspx, Dec. 1, 2011, 5 pages.

(Continued)

*Primary Examiner* — Santiago Garcia
(74) *Attorney, Agent, or Firm* — Michael O'Keefe; Andrew D. Wright; Roberts Calderon Safran & Cole, P.C.

(57) ABSTRACT

Systems and methods for detecting doorway tailgating are disclosed. A method includes: determining, by a computer device, a mobile device moves through a doorway to a secure area; determining, by the computer device, a security protocol was not passed for the mobile device to move through the doorway; and generating, by the computer device, an alert based on both the determining the mobile device moves through the doorway to the secure area and the determining the security protocol was not passed.

16 Claims, 3 Drawing Sheets

Related U.S. Application Data continuation-in-part of application No. 15/248,612, filed on Aug. 26, 2016, now Pat. No. 9,905,101.

(51) Int. Cl.
| | |
|---|---|
| *H04W 4/029* | (2018.01) |
| *H04W 4/80* | (2018.01) |
| *G07C 9/20* | (2020.01) |
| *H04W 4/30* | (2018.01) |
| *G08B 13/00* | (2006.01) |

(52) U.S. Cl.
CPC ............... *H04W 4/30* (2018.02); *H04W 4/80* (2018.02); *G07C 2009/00769* (2013.01); *G07C 2209/64* (2013.01); *G08B 13/00* (2013.01)

(56) References Cited

U.S. PATENT DOCUMENTS

| | | | |
|---|---|---|---|
| 9,589,446 B1* | 3/2017 | Dey | G08B 13/08 |
| 9,905,101 B1 | 2/2018 | Billau et al. | |
| 2007/0007338 A1 | 1/2007 | Pacorich et al. | |
| 2007/0268145 A1* | 11/2007 | Bazakos | G07C 9/28 340/573.1 |
| 2008/0030328 A1* | 2/2008 | Sharma | G08B 13/08 340/552 |
| 2009/0300507 A1 | 12/2009 | Raghavan et al. | |
| 2013/0314210 A1* | 11/2013 | Schoner | G08B 13/2485 340/8.1 |
| 2014/0035726 A1* | 2/2014 | Schoner | H04W 4/029 340/8.1 |
| 2014/0266687 A1* | 9/2014 | Britton | H04Q 9/00 340/539.1 |
| 2015/0116108 A1* | 4/2015 | Fadell | G06Q 10/083 340/501 |
| 2015/0130608 A1* | 5/2015 | Sharma | G08B 13/08 340/501 |
| 2015/0163334 A1 | 6/2015 | Shin | |
| 2015/0373022 A1* | 12/2015 | Dubman | H04L 12/2825 726/3 |
| 2016/0035196 A1 | 2/2016 | Chan | |
| 2016/0055694 A1* | 2/2016 | Saeedi | G07C 9/257 340/5.52 |
| 2016/0098874 A1* | 4/2016 | Handville | G07C 9/00658 340/5.61 |
| 2016/0307380 A1* | 10/2016 | Ho | G07C 9/00309 |
| 2016/0308859 A1* | 10/2016 | Barry | G06K 9/2036 |
| 2016/0343185 A1* | 11/2016 | Dumas | G07C 9/00309 |
| 2016/0348415 A1* | 12/2016 | Baumgarte | E05F 15/63 |
| 2016/0373522 A1* | 12/2016 | Carlos | G06Q 10/10 |
| 2017/0011570 A1* | 1/2017 | Johnson | G07C 9/00571 |
| 2017/0076567 A1* | 3/2017 | Soldner | G08B 13/08 |
| 2017/0098351 A1* | 4/2017 | Modi | G08B 13/22 |
| 2018/0082557 A1 | 3/2018 | Billau et al. | |

OTHER PUBLICATIONS

Piggybacking Security, Wikipedia, https://en.wikipedia.org/wiki/Piggybacking_(security), accessed May 5, 2016, 2 pages.

List of IBM Patents or Patent Applications Treated as Related dated May 10, 2019; 1 page.

* cited by examiner

TAILGATING DETECTION

BACKGROUND

The present invention generally relates to detecting unauthorized entry into a secure area and, more particularly, to a system and method for detecting doorway tailgating.

It is common for buildings and other structures to have restricted access areas (also called secure areas) that can only be entered and exited by controlled access points, such as locked doors, turnstiles, etc. Admittance of a person through a controlled access point is often automated through access control systems that utilize an RFID reader at the controlled access point and access cards (e.g., badges) that have a radio frequency identification (RFID) tags. Authorized persons are issued an access card having a unique RFID tag, and the system electronically unlocks a door or turnstile at the controlled access point when the RFID reader detects the presence of an RFID tag of an authorized person. In this manner, the controlled access point may remain normally locked to prevent access of unauthorized persons, and may be temporarily unlocked when presented with an RFID tag of an authorized person.

One of the biggest weaknesses of automated access control systems is the fact that most systems cannot actually control how many people enter a controlled access point when an access card is presented. For example, most systems allow you to control which card works at a particular controlled access door, but once an employee opens the door with their authorized access card, any number of people can follow behind the employee and enter into the building. Similarly, when an employee exits the building, it is very easy for a person to grab the open door and enter the building as the employee is leaving. These practices are referred to as "tailgating" which generally refers to one or more persons gaining access through a controlled access point by following another person through the access point and without presenting an access card. Other examples of tailgating include an employee opening a door and holding it open for others, visitors without badges, or the passive acceptance of a uniformed worker.

Types of technologies that are currently used to detect tailgating include: smart cards that house multiple credentials on one card; security guards that can visually confirm a badge matches the holder; turnstiles that serve as a physical barrier and are good for high-volume traffic; laser sensors that can detect multiple people; biometrics that deter employees from sharing credentials; long-range readers that can be used in parking lots and garages; PIN numbers that can be added to card readers; camera analytics that enable remote facial recognition; visitor badges that ensure temporary guests are documented; and traps or air locks that require a double set of identification.

SUMMARY

In a first aspect of the invention, there is a method that includes: determining, by a computer device, a mobile device moves through a doorway to a secure area; determining, by the computer device, a security protocol was not passed for the mobile device to move through the doorway; and generating, by the computer device, an alert based on both the determining the mobile device moves through the doorway to the secure area and the determining the security protocol was not passed.

In another aspect of the invention, there is a system that includes: a plurality of micro-location devices arranged at a doorway; a sensor configured to detect an open/closed state of the doorway; an electronic access control device that selectively locks and unlocks a door in the doorway; and a computer device configured to determine an unauthorized entry of a mobile device through the doorway into a secure area based on data received from the plurality of micro-location devices, data received from the sensor, and data received from the electronic access control device.

In another aspect of the invention, there is a computer program product that includes a computer readable storage medium having program instructions embodied therewith. The program instructions are executable by a computing device to cause the computing device to: receive data from micro-location devices arranged at a doorway; receive data from an electronic access control device that selectively locks and unlocks a door in the doorway; determine a number of access credentials presented at the electronic access control device based on the data received from the electronic access control device; determine a number of mobile devices that move through the doorway based on the data received from the micro-location devices; compare the number of access credentials presented at the electronic access control device to the number of mobile devices that move through the doorway; determine an unauthorized entry through the doorway based on the comparing; and generate an alert based on the determining the unauthorized entry.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
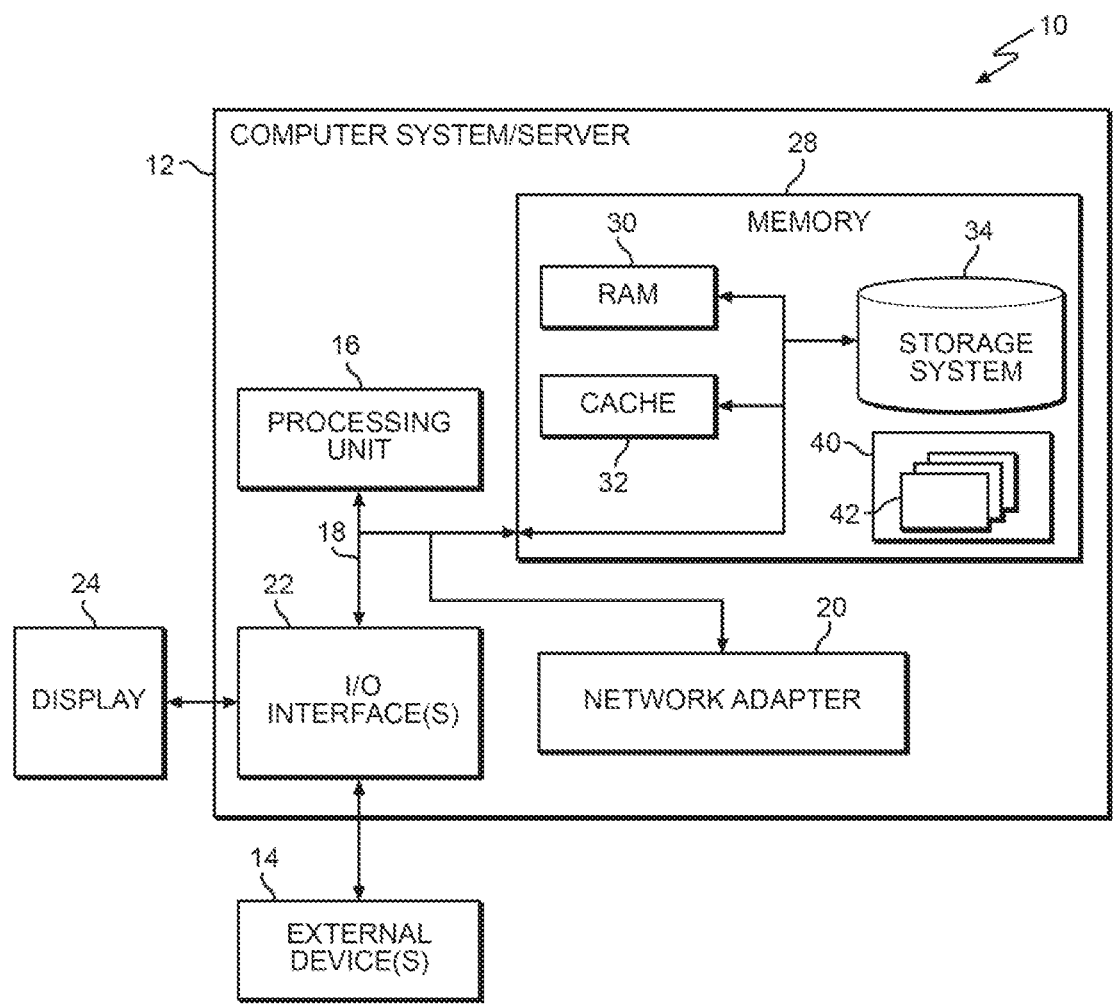
FIG. 1 depicts a computing infrastructure according to an embodiment of the present invention.

The present invention generally relates to detecting unauthorized entry into a secure area and, more particularly, to a system and method for detecting doorway tailgating. Systems and methods in accordance with aspects of the invention use micro-location technologies to detect a potential security breach via tailgating. In embodiments, micro-location technologies are used to monitor the location and direction of travel of a mobile device (e.g., a smartphone, smart watch, tablet computer, etc.) relative to a controlled access point (e.g., an electronically locked door). Information regarding the state of the controlled access point (e.g., whether a door is opened or closed) can be used to determine whether a mobile device should be allowed into the secure area. In situations when passage into the secure area has been granted (e.g., via an authorized access card or other security protocol), the system can monitor for more than one mobile device traveling through the controlled access point from outside the secure area. In situations when a controlled access point has been opened from inside the secure area, the system can recognize that a mobile device is moving into the secure area without access rights and generate an appropriate notification. In this manner, implementations of the invention are usable to detect tailgating and provide an alert when tailgating is detected.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
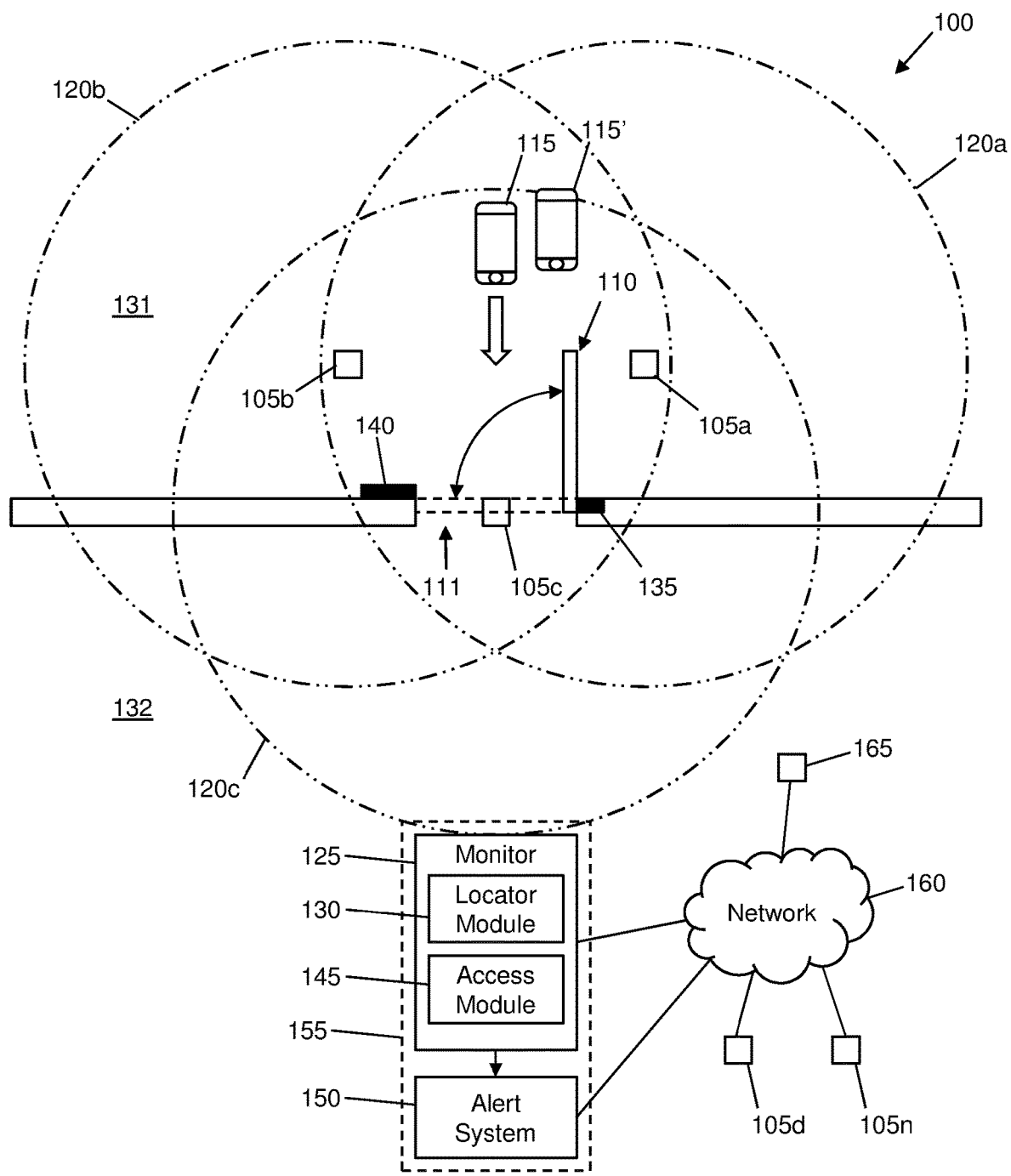
FIG. 2 shows a block diagram of an exemplary system in accordance with aspects of the invention.

FIG. 2 shows a block diagram of an exemplary system 100 in accordance with aspects of the invention. In embodiments, the system 100 includes a plurality of micro-location devices 105*a*, 105*b*, 105*c* arranged around a controlled access point such as an electronically locked door 110 in a doorway 111. The micro-location devices 105*a-c* are electronic devices that use micro-location technologies to determine a location of one or more mobile devices 115 in the vicinity of the controlled access point. One such example of micro-location technologies is a WiFi positioning system (WPS or WiPS or WFPS), which may be used to determine the position of mobile devices (e.g., smartphone, smart watch, tablet computer, etc.) with respect to WiFi sensors. Each mobile device has a unique MAC address that is wirelessly transmitted while looking for and establishing WiFi connections, even without actually connecting to a WiFi access point. WiFi sensors may be used to determine the location of a mobile device using this information that is wirelessly transmitted from the mobile device. For example, the precise location of a mobile device that is within range of at least three spaced apart WiFi sensors can be determined using a triangulation algorithm.

Aspects of the invention leverage micro-location technologies, via the micro-location devices 105*a-c*, to determine the location and movement of mobile computing devices relative to a controlled access point, such as the doorway 111, to detect when tailgating occurs at the controlled access point. In embodiments, the micro-location devices 105*a-c* are WiFi devices (sensors) configured to utilize WPS to determine a location of one or more devices 115. Embodiments are not limited to WPS, and implementations of the invention may utilize other types of micro-location technologies including, but not limited to, Bluetooth Low Energy (BLE) beacons, Near Field Communication (NFC), and Global Positioning System (GPS). Implementations of the invention may also utilize more than one type of micro-location technology at a single controlled access point, e.g., both WPS and BLE, to increase the accuracy of the location determination of mobile devices relative to the controlled access point.

As shown in FIG. 2, each micro-location device 105a-c has an associated range 120a-c in which it can detect a mobile device 115 using micro-location technology. In embodiments, the micro-location devices 105a-c are spatially arranged relative to the doorway 111 such that the ranges 120a-c overlap in the vicinity of the doorway 111, such that the system uses data from the micro-location devices 105a-c to determine a location of a mobile device 115 via triangulation. The micro-location devices 105a-c may be physically located around the doorway 111 in any suitable manner, such as being mounted in or on a floor, wall, or ceiling of a structure (e.g., a building) that contains the doorway 111.

Still referring to FIG. 2, the system 100 includes a monitor 125, which may be a computing device similar to the computer device 12 of FIG. 1. In embodiments, the monitor 125 is in communication with the micro-location devices 105a-c and receives location data of the mobile device 115 via the micro-location devices 105a-c. In embodiments, the monitor 125 includes a locator module 130, which may be a program module similar to program module 42 of FIG. 1, that determines the location of the mobile device 115 using the data from the micro-location devices 105a-c, e.g., using triangulation techniques.

According to aspects of the invention, the monitor 125 receives data from the micro-location devices 105a-c at regularly timed intervals (e.g., once a second), and the locator module 130 uses this data to determine the location of the mobile device 115 at different times. In embodiments, the locator module 130 is programmed with or has access to data that defines a location of the doorway 111 (e.g., coordinates of a floor plan of a building that includes the doorway 111). The locator module 130 may also be programmed with or have access to data that defines an unsecure area 131 side of the door 110 and a secure area 132 side of the door 110 (e.g., coordinates of the floor plan of the building that includes the doorway 111). By comparing the determined locations of the mobile device 115 to the defined location of the doorway 111, the locator module 130 may determine a path of travel of the mobile device 115 relative to the doorway 111. In this manner, the system can determine when the mobile device 115 passes through the doorway 111 and in which direction the mobile device 115 passes through the doorway 111. Moreover, by comparing the path of travel of the mobile device 115 to the coordinates of the unsecure area 131 and the secure area 132, the system can determine whether the mobile device 115 has entered the secure area 132 or exited the secure area 132 when moving through the doorway 111.

Using the micro-location techniques described herein, the system including the monitor 125 and micro-location devices 105a-c is capable of determining the respective locations of plural different mobile devices 115, 115' at any given time. In this manner, the system is capable of determining when more than one mobile device passes through the doorway 111 and a direction of travel for each mobile device relative to the doorway 111.

With continued reference to FIG. 2, the system 100 may include a sensor 135 that indicates an open/closed status of the door 110 in the doorway 111. The sensor 135 may comprise, for example, a photoeye, proximity sensor, or other sensor that is capable of determining when the door 110 is open and when the door 110 is closed. The sensor 135 is communicatively connected to the monitor 125 such that data from the sensor 135 may be communicated to and used by the monitor 125.

The system 100 may also include an electronic access control device 140 associated with the door 110. The electronic access control device 140 may be a conventional device such as an RFID reader or keypad by which a person can provide credentials (e.g., via RFID badge or PIN entry) to verify their authorized access to the door 110, e.g., pass a security protocol. The electronic access control device 140 may have a default state of electronically locking the door 110, and may operate to electronically unlock the door 110 when suitable credentials are provided (e.g., via RFID badge or PIN entry). In embodiments, the electronic access control device 140 is communicatively connected to the monitor 125 such that data from the electronic access control device 140 may be communicated to and used by the monitor 125.

According to aspects of the invention, the system is configured to use the location data of a mobile device 115 determined by the locator module 130, the open/closed status of the door 110 from the sensor 135, and the data from the electronic access control device 140 to determine when a mobile device 115 passes through the doorway 111 without authorization, e.g., without a security protocol having been passed. In embodiments, an access module 145 may receive data from the locator module 130, the sensor 135, and the electronic access control device 140, and the access module 145 may be programmed with appropriate logic to use this data to determine when a mobile device 115 passes through the doorway 111 with or without proper access. The access module 145 may be a program module of the monitor 125, similar to program module 42 of FIG. 1.

In a first illustrative example, the access module 145 receives data from the sensor 135 indicating that the door 110 is open and data from the electronic access control device 140 indicating that an access credential is provided (e.g., a security protocol has been passed). Still in this example, at the same time during which the door 110 is open, the access module 145 receives data from the locator module 130 indicating that a mobile device 115 moves through the doorway 111 from the unsecure area 131 to the secure area 132. In this situation, e.g., where a single mobile device 115 passes through the doorway 111 into the secure area 132 concurrent with presentation of access credentials, the access module 145 is programmed to determine that an authorized entry has occurred.

In a second illustrative example, the access module 145 receives data from the sensor 135 indicating that the door 110 is open and data from the electronic access control device 140 indicating that only a single access credential is provided. Still in this example, at the same time during which the door 110 is open, the access module 145 receives data from the locator module 130 indicating that a first mobile device 115 and a second mobile device 115' both move through the doorway 111 from the unsecure area 131 to the secure area 132. In this situation, e.g., where more than one mobile device 115 passes through the doorway 111 into the secure area 132 concurrent with presentation of only a single access credential, the access module 145 is programmed to determine that an unauthorized entry (e.g., security breach) has occurred. This example illustrates a type of tailgating where a first person presents first access credentials at the electronic access control device 140, opens the door 110 and passes through the doorway 111, and a second person follows the first person through the doorway 111 without presenting second access credentials at the electronic access control device 140 (e.g., without passing their own security protocol).

In a third illustrative example, the access module 145 receives data from the sensor 135 indicating that the door 110 is open and data from the electronic access control device 140 indicating that no access credential has been provided (e.g., a security protocol was not passed). Still in this example, at the same time during which the door 110 is open, the access module 145 receives data from the locator module 130 indicating that the mobile device 115 moves through the doorway 111 from the secure area 132 to the unsecure area 131. In this situation, e.g., where a single mobile device 115 passes through the doorway 111 from the secure area 132 to the unsecure area 131, the access module 145 may be programmed to determine that an exit has occurred.

In a fourth illustrative example, the access module 145 receives data from the sensor 135 indicating that the door 110 is open and data from the electronic access control device 140 indicating that no access credential has been provided (e.g., a security protocol was not passed). Still in this example, at the same time during which the door 110 is open, the access module 145 receives data from the locator module 130 indicating that a first mobile device 115 moves through the doorway 111 from the secure area 132 to the unsecure area 131, and that a second mobile device 115' moves through the doorway 111 from the unsecure area 131 to the secure area 132. In this situation, e.g., where a mobile device 115' passes through the doorway 111 from the unsecure area 131 to the secure area 132 without any access credential being provided, the access module 145 may be programmed to determine that an unauthorized entry has occurred. This example illustrates a type of tailgating where a first person exits through the doorway 111, and a second person who is initially in the unsecure area 131 grabs the door 110 while it is still open and passes through the doorway 111 into the secure area 132 without presenting any credentials.

According to aspects of the invention, the monitor 125 is configured to determine that an unauthorized entry has occurred when a number of mobile devices that move through the doorway 111 into the secure area 132 exceeds a number of access credentials that were provided at the electronic access control device 140. For example, the in the second example described above, two mobile device moved through the doorway 111 into the secure area 132 while only one access credential was provided at the electronic access control device 140. Similarly, in the fourth example described above, one mobile device moved through the doorway 111 into the secure area 132 while zero access credential were provided at the electronic access control device 140. Accordingly, in both examples, the monitor 125 determined that an unauthorized entry occurred. Implementations of the invention are not limited to these examples, and the monitor 125 may be configured to determine that an unauthorized entry has occurred under different combinations of data from the locator module 130, sensor 135, and electronic access control device 140.

In accordance with aspects of the invention, the monitor 125 is configured to initiate an alert when the monitor 125 determines that an unauthorized entry has occurred. In embodiments, upon detecting that an unauthorized entry has occurred at the doorway 111, the monitor 125 transmits data to an alert system 150 that generates one or more alerts. The alert may take any suitable form or plurality of forms. For example, the alert system 150 may cause a light (e.g., a flashing light) to be emitted at a location in the vicinity of the door 110 at which the unauthorized entry occurred. In another example, the alert system 150 may cause a sound (e.g., a buzzer or siren) to be emitted at a location in the vicinity of the door 110 at which the unauthorized entry occurred. In another example, the alert system 150 may cause a visible and/or audible message to be output at a computing device in the vicinity of the door 110. In another example, the alert system 150 may cause a visible and/or audible message to be output at a computing device at a remote location relative to the door 110. Implementations of the invention are not limited to these examples, and the alert system 150 may be configured to generate any number and any type of alerts based on the determined unauthorized entry.

The alert system 150 may be a computer system that is separate from and communicatively connected to the monitor 125. Alternatively, the alert system 150 and the monitor 125 may be part of a single device 155.

In embodiments, based upon the monitor 125 determining that an unauthorized entry has occurred, one of the monitor 125 and the alert system 150 may communicate with additional devices in the building to track the location of the unauthorized person within the building. For example, the locator module 130 may communicate with one or more additional micro-location devices $105d \ldots 105n$ that are located within the secure area 132 to track the location of a mobile device 115 within the secure area 132 after it has been determined that the mobile device 115 made an unauthorized entry through the doorway 111. The locator module 130 may communicate with one or more additional micro-location devices $105d \ldots 105n$ via a network 160, which may be any suitable type of communications network such as LAN, WAN, and the Internet. In another example, the alert system 150 may communicate with one or more camera devices 165 to obtain image data (e.g., pictures of video) of a person that made an unauthorized entry through the doorway 111. For example, the alert system 150 may cause one or more cameras 165 to start recording image data based upon the alert system 150 receiving an indication of an unauthorized entry from the monitor 125.

In accordance with aspects of the invention, the access module 145 may be programmed with or have access to data that defines pairings between respective mobile devices and respective access credentials. For example, a first mobile device 115 may be paired (e.g., associated) with a first unique access credential, and a second mobile device 115' may be paired with a second unique access credential. The access module 145 may be configured to determine an unauthorized entry when a mobile device passes through the door with an access credential other than the access credential that is paired with that particular mobile device. For example, the access module 145 may be configured to determine an unauthorized entry when the first mobile device 155 moves through the doorway 111 into the secure area 132 concurrently with presentation of the second access credential. This type of situation may be indicative of a person who has borrowed another person's access credential.

In accordance with aspects of the invention, the access module 145 may be programmed to learn that a particular access credential is associated with a particular mobile device. For example, the access module 145 may be programmed to determine that a first access credential is associated with a first mobile device 115 based on a history of the first access credential being used with the first mobile device 115 for a least a threshold number of times at the door 110. In this manner, when a second mobile device 115' moves through the doorway 111 into the secure area 132 concurrently with presentation of the first access credential, the access module 145 may determine that an unauthorized entry has occurred.

Figure 3:
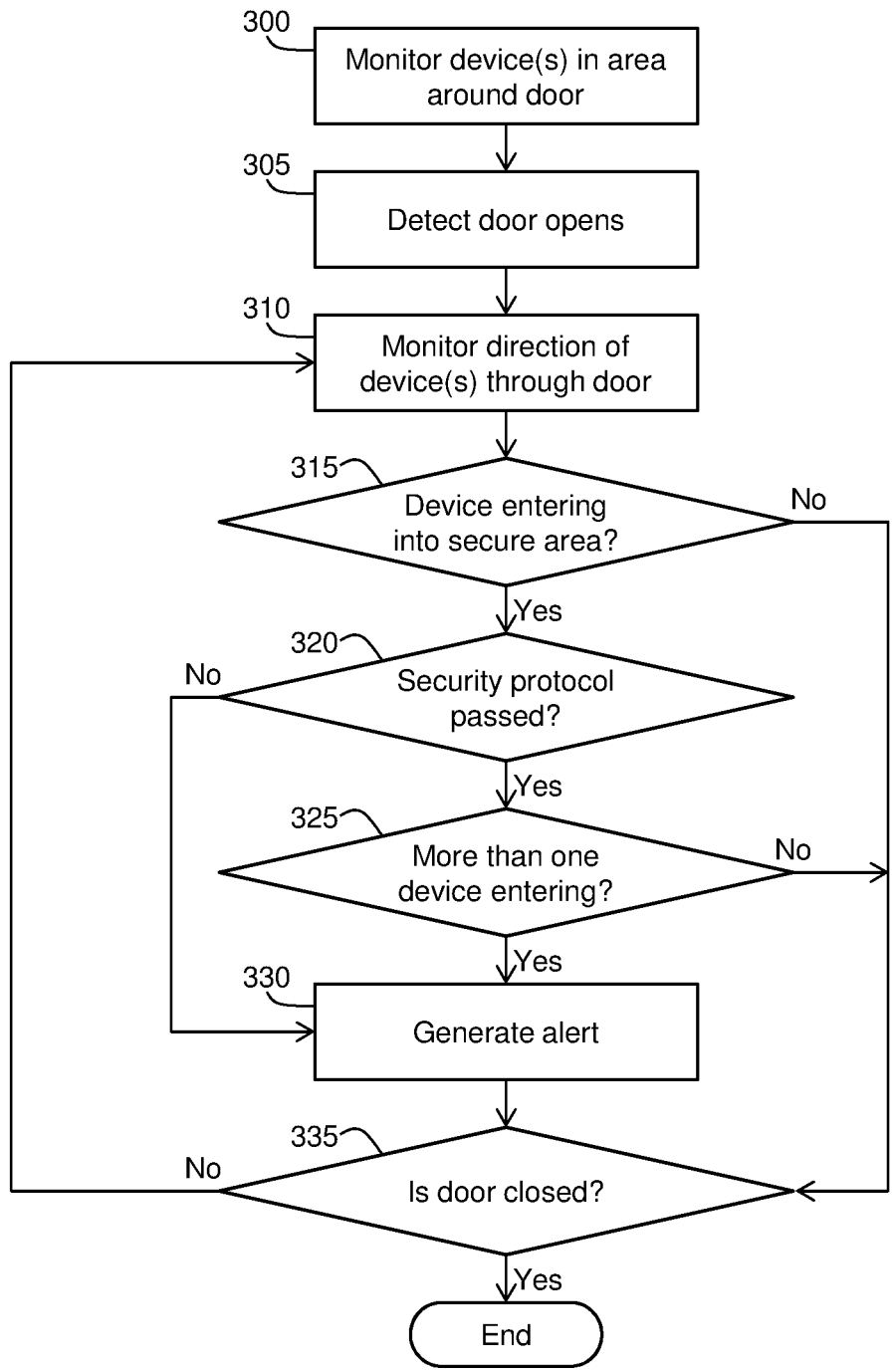
FIG. 3 shows a flowchart of a method in accordance with aspects of the invention.

FIG. 3 depicts a method of detecting a tailgating security breach via micro-location technologies in accordance with aspects of the invention. The steps of the method may be performed in the system of FIG. 2 and are described with reference to the elements described in FIG. 2.

Referring to FIG. 3, at step 300 the system 100 monitors the location of one or more mobile devices 115 in an area around a door 110 in a doorway 111. Step 300 may be performed in the manner described with respect to FIG. 2, e.g., using micro-location devices 105a-c to determine the location of one or more mobile devices 115.

At step 305, the system detects that the door 110 opens. In embodiments, a sensor 135 detects the open/closed state of the door 110 and transits corresponding data to a monitor 125.

At step 310, the system monitors the direction of travel of the mobile device through the doorway 111. Step 300 may be performed in the manner described with respect to FIG. 2, e.g., by the locator module 130 determining the direction of travel of a mobile device 115 through the doorway 111, e.g., by determining the location of the mobile device 115 at plural consecutive times and comparing the path of the mobile device to a defined location of the doorway 111.

At step 315, the system determines whether the mobile device enters the secure area. As described with respect to FIG. 2, the monitor 125 may use the determined path of travel of the mobile device 115 and the defined locations of the unsecure area 131 to the secure area 132 to determine one of: the mobile device 115 moves from the unsecure area 131 to the secure area 132 (e.g., entered the secure area 132); and the mobile device 115 moves from the secure area 132 to the unsecure area 131 (e.g., exited the secure area). In the event the mobile device is determined as exiting the secure area 132 (step 315=No), then the process proceeds to step 335 where the system uses the sensor 135 to determine whether the door 110 is open or closed.

On the other hand, in the event the mobile device is determined as entering the secure area 132 (step 315=Yes), then at step 320 the system determines whether a security protocol was passed. Step 320 may be performed in the manner described with respect to FIG. 2, e.g., by analyzing the data from the electronic access control device 140 to determine if a valid access credential was presented.

In the event the security protocol is not passed at step 320 (step 320=No), then at step 330 the system generates an alert. Step 320 may be performed in the manner described with respect to FIG. 2, e.g., by the access module transmitting data to an alert system 150 that generates an alert. Following the generating the alert at step 330, the process proceeds to step 335 where the system uses the sensor 135 to determine whether the door 110 is open or closed.

Referring back to step 320, in the event the security protocol is passed (step 320=Yes), then at step 325 the system determines whether more than one mobile device is entering the secure area 132 through the doorway 111. In the event it is determined that more than one mobile device is entering (step 325=Yes), then the process proceeds to step 330 where the alert is generated. On the other hand, in the event it is determined that more than one mobile device is not entering (step 325=no), then the process proceeds to step 335 where the system uses the sensor 135 to determine whether the door 110 is open or closed.

At step 335, the system determines whether the door 110 is closed. In embodiments, as described with respect to FIG. 2, the monitor 125 receives data from the sensor 135 that indicates the open/closed state of the door 110. When the door 110 is closed (step 335=Yes), this iteration of the process ends and the process resets to step 300. When the door is not closed (step 335=No), the process returns to step 310 where the system continues to monitor for movement of mobile devices through the doorway 111.

In accordance with the description herein, implementations of the invention provide a system and method for detecting a tailgating security breach via micro-location technologies. Aspects of the system and method may include instrumenting an area around a doorway 111 with two or more sensors (e.g., micro-location devices 105a-c) such that the direction of travel of sensed mobile devices 115 can be determined. The sensors may detect, e.g., WiFi or Bluetooth on a mobile device. Aspects of the system and method may include assigning a different level of security to each side of the doorway 111, e.g., a secure area 132 and an unsecure area 131. Aspects of the system and method may include instrumenting the doorway 111 such that the open/close state of the door can be determined (e.g., using sensor 135). Aspects of the system and method may include receiving notice that access has been granted to open the door from a first access method, such as a conventional RFID badge (e.g., using electronic access control device 140). Aspects of the system and method may include tracking, via the sensors, movement of the mobile device through the doorway 111 to the secure area side and, if more than a single sensed device is tracked through the doorway 111, trigger an alert. Aspects of the system and method may include detecting entry into secure area when the door is opened from the secure side. Aspects of the system and method may include detecting that the door has opened, tracking one device through the doorway 111 from the secure side, and tracking another device through the doorway 111 into the secure side, and triggering an alert.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a plurality of micro-location devices arranged at a doorway;
   a sensor configured to detect an open/closed state of the doorway;
   an electronic access control device that selectively locks and unlocks a door in the doorway; and
   a computer device configured to:
      determine a location of a mobile device relative to a doorway based on data received from a plurality of micro-location devices; and
      determine an unauthorized entry of the mobile device through the doorway into a secure area based on the data received from the plurality of micro-location devices, data received from the sensor, and data received from the electronic access control device.

2. The system of claim 1, wherein the determining the unauthorized entry of the mobile device through the doorway into the secure area comprises comparing a number of mobile devices that pass through the doorway into the secure area to the data from the electronic access control device.

3. The system of claim 2, wherein the computer device determines whether a security protocol has been passed based on the data received from the electronic access control device.

4. The system of claim 3, further comprising tracking a location of the mobile device inside the secure area based on the determining the unauthorized entry.

5. The system of claim 1, wherein the micro-location devices comprise WiFi sensors configured to utilize WiFi positioning system (WPS) to determine locations of computer devices.

6. The system of claim 1, wherein the micro-location devices comprise Bluetooth Low Energy (BLE) beacons.

7. The system of claim 1, wherein the micro-location devices comprise a combination of WiFi sensors and Bluetooth Low Energy (BLE) beacons.

8. The system of claim 1, wherein the micro-location devices are spatially arranged relative to the doorway such that ranges of the micro-location devices overlap each other at the doorway.

9. A system, comprising:
   a plurality of micro-location devices arranged at a doorway;
   a sensor configured to detect an open/closed state of the doorway;
   an electronic access control device that selectively locks and unlocks a door in the doorway; and
   a computer device configured to:
      determine a location of a mobile device relative to a doorway based on data received from a plurality of micro-location devices; and
      determine an unauthorized entry of the mobile device through the doorway into a secure area based on the data received from the plurality of micro-location devices, data received from the sensor, and data received from the electronic access control device,
      wherein the computer device is configured to determine a path of travel of the mobile device relative to the doorway; and
      the determining the unauthorized entry is based on the determined path of travel.

10. The system of claim 9, wherein the determining the path of travel of the mobile device relative to the doorway comprises determining plural different locations of the mobile device at different times.

11. The system of claim 10, wherein the determining the path of travel of the mobile device relative to the doorway comprises comparing the plural different locations to data that defines an unsecure area side of the door and a secure area side of the door.

12. The system of claim 9, wherein the micro-location devices comprise WiFi sensors configured to utilize WiFi positioning system (WPS) to determine locations of computer devices.

13. The system of claim 9, wherein the micro-location devices comprise Bluetooth Low Energy (BLE) beacons.

14. The system of claim 9, wherein the micro-location devices comprise a combination of WiFi sensors and Bluetooth Low Energy (BLE) beacons.

15. The system of claim 9, wherein the micro-location devices are spatially arranged relative to the doorway such that ranges of the micro-location devices overlap each other at the doorway.

16. The system of claim 9, wherein the determining the unauthorized entry of the mobile device through the doorway into the secure area comprises comparing a number of mobile devices that pass through the doorway into the secure area to the data from the electronic access control device.

* * * * *